(12) United States Patent
Murase et al.

(10) Patent No.: US 11,603,002 B2
(45) Date of Patent: Mar. 14, 2023

(54) CHARGE AND DISCHARGE DEVICE FOR ELECTRIC VEHICLE

(71) Applicants: KAWAMURA ELECTRIC, INC., Seto (JP); HONDA MOTOR CO., LTD., Tokyo (JP)

(72) Inventors: Haruhiko Murase, Seto (JP); Norio Takahashi, Seto (JP); Makoto Ogawa, Wako (JP); Michihito Okado, Wako (JP)

(73) Assignees: KAWAMURA ELECTRIC, INC., Seto (JP); HONDA MOTOR CO., LTD., Tokyo (JP)

(*) Notice: Subject to any disclaimer, the term of this patent is extended or adjusted under 35 U.S.C. 154(b) by 122 days.

(21) Appl. No.: 15/678,750

(22) Filed: Aug. 16, 2017

(65) Prior Publication Data

US 2018/0086218 A1    Mar. 29, 2018

(30) Foreign Application Priority Data

Sep. 26, 2016    (JP) .............................. JP2016-187325

(51) Int. Cl.
  *B60L 53/14*    (2019.01)
  *B60L 53/30*    (2019.01)
  *B60L 53/18*    (2019.01)
(52) U.S. Cl.
  CPC ............... *B60L 53/14* (2019.02); *B60L 53/18* (2019.02); *B60L 53/30* (2019.02);
  (Continued)
(58) Field of Classification Search
  CPC ............. Y02T 10/7005; Y02T 10/7072; Y02T 10/7088; Y02T 90/14; Y02T 90/121;
  (Continued)

(56) References Cited

U.S. PATENT DOCUMENTS 6,692,284 B1* 2/2004 Koh ...................... B60L 3/0069
                                                        439/346
D664,086 S  *  7/2012 Chin-Ho Kim .............. D13/107
(Continued)

FOREIGN PATENT DOCUMENTS

CN         102044891 A    5/2011
JP         11-178234 A    7/1999
(Continued)

OTHER PUBLICATIONS

Office Action dated Jul. 23, 2019, issued in counterpart JP Application No. 2016-187325, with English translation (6 pages).
(Continued)

*Primary Examiner* — David V Henze-Gongola
*Assistant Examiner* — Tarikh Kanem Rankine
(74) *Attorney, Agent, or Firm* — WHDA, LLP

(57) ABSTRACT

A charge and discharge device for an electric vehicle includes a cable, a holder, and a cable suspending portion. The cable has a distal end at which a charge connector is provided. The charge connector is coupled to an electric vehicle to charge and discharge. The holder holds the charge connector. The cable suspending portion suspends and holds the cable. The holder and the cable suspending portion are disposed at a housing installed on a wall surface. The cable is extracted from the housing. The housing has a side portion at which a tapered surface as a surface facing obliquely ahead is disposed. The holder is mounted on the tapered surface.

2 Claims, 4 Drawing Sheets

(52) U.S. Cl.
CPC ........... *B60Y 2200/91* (2013.01); *Y02T 10/70* (2013.01); *Y02T 10/7072* (2013.01); *Y02T 90/12* (2013.01); *Y02T 90/14* (2013.01)

(58) Field of Classification Search
CPC ............... Y02T 90/128; B60L 11/1818; B60L 11/1816; B60L 2230/12; B60L 53/14; B60L 53/18; B60L 53/30; H02J 7/0042
USPC .................................................. 320/109, 107
See application file for complete search history.

(56) References Cited

U.S. PATENT DOCUMENTS

| | | | |
|---|---|---|---|
| 9,061,597 B2 * | 6/2015 | Oda | B60L 53/305 |
| 9,597,970 B2 * | 3/2017 | DeBoer, III | B60L 53/68 |
| 9,610,851 B2 * | 4/2017 | DeBoer | B60L 11/1824 |
| 2010/0315040 A1 * | 12/2010 | Sakurai | B60L 53/11 |
| | | | 320/109 |
| 2011/0145141 A1 * | 6/2011 | Blain | B60L 53/665 |
| | | | 705/39 |
| 2011/0169447 A1 * | 7/2011 | Brown | B60L 3/0069 |
| | | | 320/109 |
| 2012/0181973 A1 * | 7/2012 | Lyden | H02J 3/383 |
| | | | 320/101 |
| 2012/0268067 A1 * | 10/2012 | Poulsen | B60L 3/00 |
| | | | 320/109 |
| 2013/0130532 A1 * | 5/2013 | Canedo | H01R 13/60 |
| | | | 439/345 |
| 2013/0169227 A1 | 7/2013 | Tremblay et al. | |
| 2013/0181674 A1 * | 7/2013 | Tremblay | H01R 13/447 |
| | | | 320/109 |
| 2013/0187599 A1 * | 7/2013 | Ranga | B60L 11/1825 |
| | | | 320/109 |
| 2013/0207606 A1 * | 8/2013 | Ranga | B60L 53/31 |
| | | | 320/109 |
| 2013/0221917 A1 * | 8/2013 | Kulkarni | B60L 53/31 |
| | | | 320/109 |
| 2013/0337669 A1 * | 12/2013 | Najera | H01R 13/6395 |
| | | | 439/133 |
| 2014/0111158 A1 * | 4/2014 | Kinomura | H02G 3/0493 |
| | | | 320/109 |
| 2014/0160280 A1 * | 6/2014 | Rodr Guez | H04N 7/188 |
| | | | 348/143 |
| 2014/0239887 A1 * | 8/2014 | Hamada | H01M 10/44 |
| | | | 320/107 |
| 2014/0266042 A1 * | 9/2014 | Storm | B60L 3/0046 |
| | | | 320/109 |
| 2014/0354240 A1 * | 12/2014 | Wang | H02J 7/007182 |
| | | | 320/136 |
| 2015/0145479 A1 | 5/2015 | DeBoer, III et al. | |

FOREIGN PATENT DOCUMENTS

| | | |
|---|---|---|
| JP | 1429514 S | 12/2011 |
| JP | 2013-150397 A | 8/2013 |
| JP | 2014-82896 A | 5/2014 |
| JP | 2015-211490 A | 11/2015 |

OTHER PUBLICATIONS

Office Action dated Feb. 23, 2022, issued in counterpart CN application No. 201710690637.1, with English translation. (10 pages).

Office Action dated Sep. 5, 2021, issued in counterpart Chinese application No. 201710690637.1. (7 pages).

Office Action dated Sep. 5, 2022, issued in counterpart Chinese application No. 201710690637.1 with Machine translation. (13 pages).

Office Action dated Jan. 11, 2023, issued in counterpart CN application No. 201710690637.1 with Machine Translation. (13 pages).

* cited by examiner

CHARGE AND DISCHARGE DEVICE FOR ELECTRIC VEHICLE

BACKGROUND

This application claims the benefit of Japanese Patent Application Number 2016-187325 filed on Sep. 26, 2016, the entirety of which is incorporated by reference.

TECHNICAL FIELD

The disclosure relates to a charge and discharge device for an electric vehicle to charge and discharge an electric vehicle and a plug-in hybrid vehicle, and especially, relates to a charge and discharge device for an electric vehicle which includes a cable and is to be installed on a wall surface.

RELATED ART

A charge and discharge device for an electric vehicle, which is installed at a residence and the like, is formed in a small size so as not to interfere at a limited space such as a parking area. A charge and discharge device for an electric vehicle with a cable having a charge connector for coupling to an electric vehicle at its distal end includes a cable holding portion at which the cable is wound and held, a holder which holds the charge connector, and similar portions, thus requiring a certain amount of installation space.

For example, in Japanese Patent Application Publication No. 2015-211490 (JP-A-2015-211490), a holder is disposed at a side portion of a housing to decrease an amount of projection of a whole device. In Japanese Patent Application Publication No. 2014-82896 (JP-A-2014-82896), a holder is disposed toward a front perpendicular to a wall surface, and a housing on which the holder is mounted is thinly formed to minimize its amount of projection.

The above-described conventional charge and discharge device for the electric vehicle is configured to be installed at a limited space. Thus, in the configuration in JP-A-2015-211490, since the holder is close to a wall surface, when a housing/extraction operation of the charge connector is performed, the charge connector or a hand of a worker who takes the charge connector sometimes contacts the wall surface. Therefore, the charge connector or the hand has been sometimes damaged.

In the configuration in JP-A-2014-82896, the holder is disposed toward the front to facilitate the operation of the charge connector from any directions. However, since the charge connector projects ahead viewing from the wall surface, a worker who gets on and off a vehicle has sometimes contacted the charge connector to break the charge connector and the holder.

Therefore, the disclosure has been made in view of the above-described problems. It is an object of the disclosure to provide a charge and discharge device for an electric vehicle where a charge connector or a hand that operates the charge connector is less likely to interfere with a wall surface when the charge connector is operated, and further, a worker is less likely to contact the charge connector installed at a holder, even though the charge and discharge device for the electric vehicle is configured to include a cable and to be installed on the wall surface.

SUMMARY

In order to achieve the above-described object, there is provided a charge and discharge device for an electric vehicle according to a first aspect of the disclosure. The charge and discharge device for the electric vehicle includes a cable, a holder, and a cable suspending portion. A distal end of the cable has a charge connector that is coupled to an electric vehicle to charge and discharge. The holder holds the charge connector. The cable suspending portion suspends and holds the cable. The holder and the cable suspending portion are disposed at a housing installed on a wall surface. The cable is extracted from the housing. The housing has a side portion at which a tapered surface as a surface facing obliquely ahead is disposed. The holder is mounted on the tapered surface.

In the configuration according to the first aspect, a second aspect of the disclosure may provide the tapered surfaces that are vertically formed at right and left side portions of the housing and formed from right and left end portions of a front surface of the housing, and the holder may be mounted on any one of the tapered surfaces.

In the configuration according to the second aspect, a third aspect of the disclosure may provide the holder that is mounted on a lower portion of the tapered surface. A part on which at least the holder of the tapered surface is mounted may have a width equal to or larger than a width of the holder. An inclined surface facing obliquely upward may be disposed at a front surface upper portion of the housing, and the housing may have a forward projection that decreases toward an upper portion.

According to the disclosure, even though the holder is disposed at the part close to the wall surface, since the side portion, on which the holder is mounted, of the housing is the tapered surface aslope formed obliquely ahead, the holder faces obliquely ahead. Thus, the held charge connector, especially its grip portion can be separated from the wall surface. Accordingly, when the holding/extraction operation is performed, it is possible to prevent the charge connector and the hand that grips it from interfering with the wall surface. In addition, compared with the configuration that holds the charge connector toward the front perpendicular to the wall surface, the amount of forward projection can be reduced. Thus, the worker becomes less likely to contact the charge connector, and the small space can be effectively utilized.

According to the configuration of the second aspect, since the tapered surfaces are formed from the right and left end portions of the front surface at right and left of the housing, the it and left end portions of the front surface are formed into obtuse angles. Accordingly, even though a person contacts the housing when getting on and off an automobile or similar action, impact can be softened.

According to the configuration of the third aspect, since the upper portion of the projecting front surface of the housing has the inclined surface facing obliquely upward, the amount of projection is decreased. Thus, even though the person who gets on and off the automobile contacts the housing, the impact can be softened. Since the holder is installed at the lower portion having a sufficient width of the tapered surface, the holder can be mounted in a stable state without being affected by the inclined surface.

DETAILED DESCRIPTION

Figure 1:
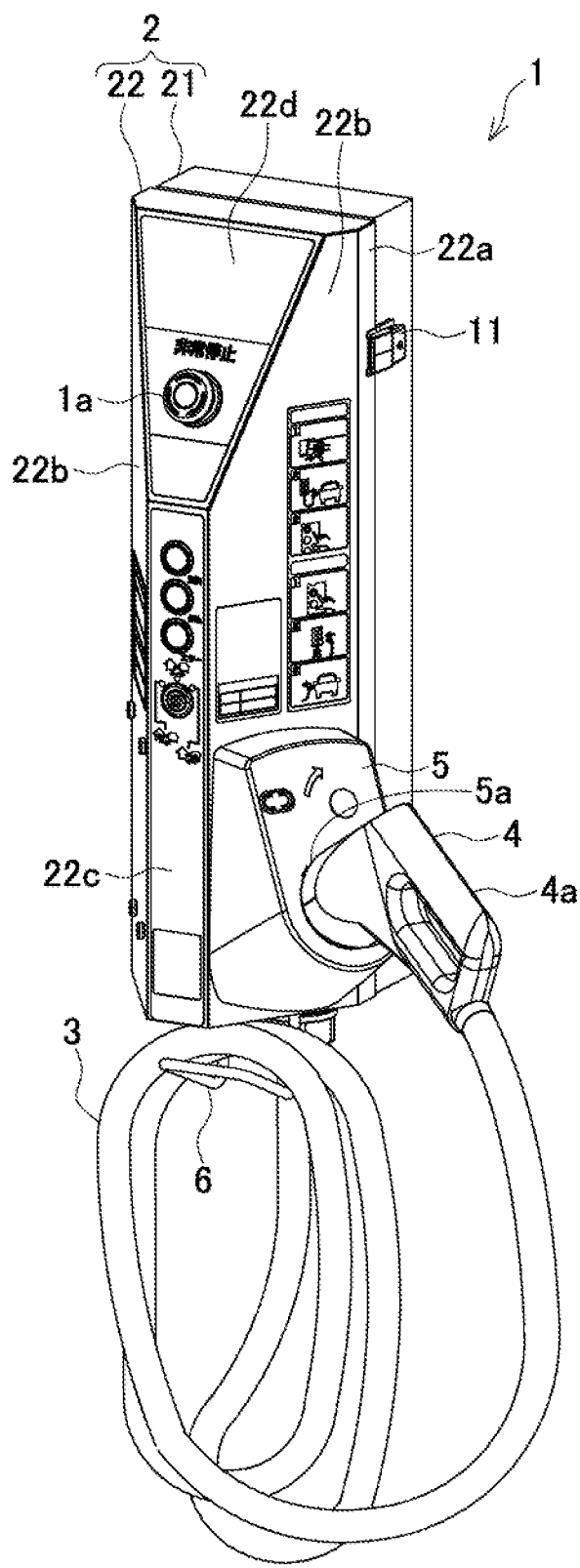
FIG. 1 is a perspective view illustrating an exemplary charge and discharge device for an electric vehicle according to the disclosure.
Figure 2:
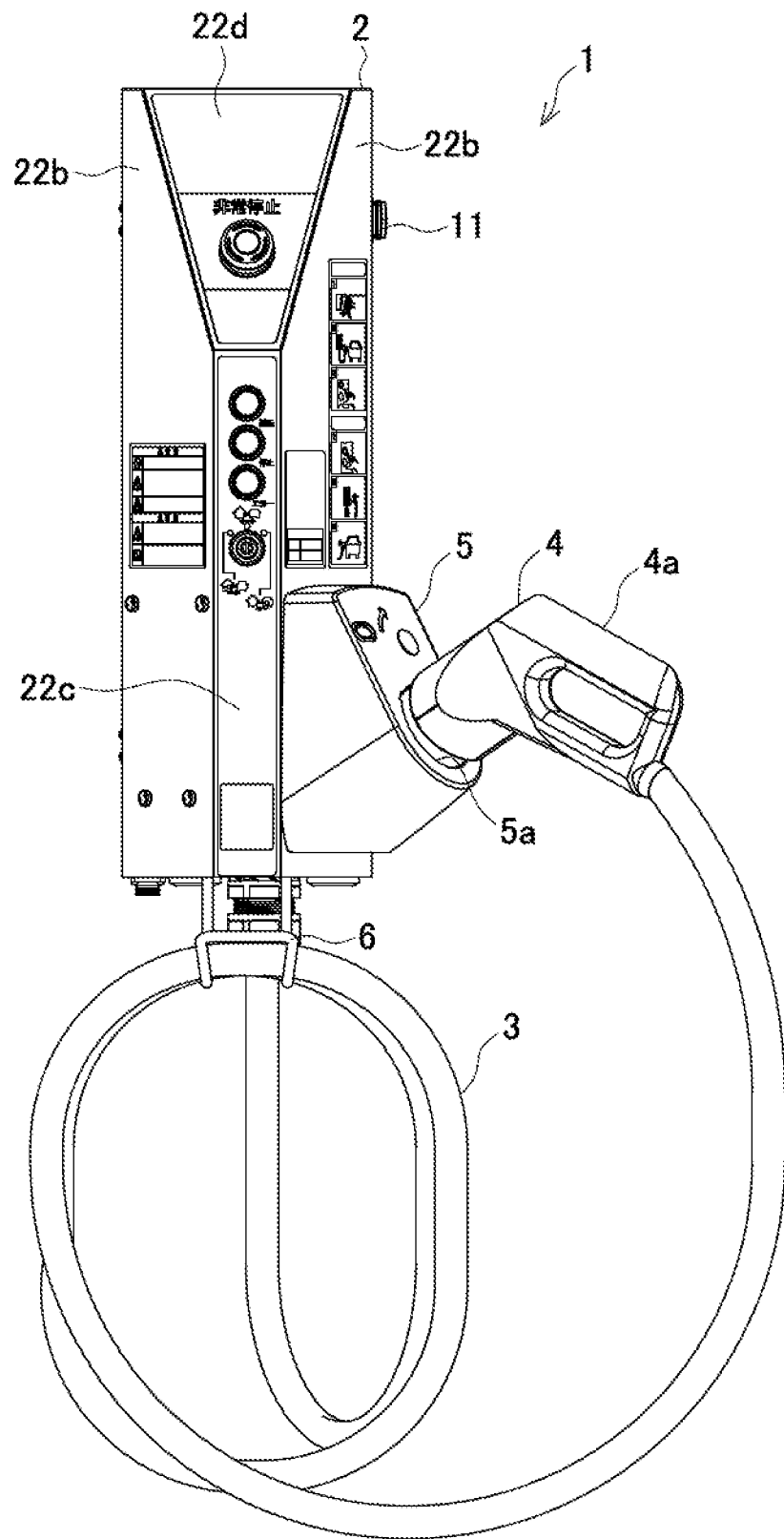
FIG. 2 is a front view of FIG. 1.
Figure 3:
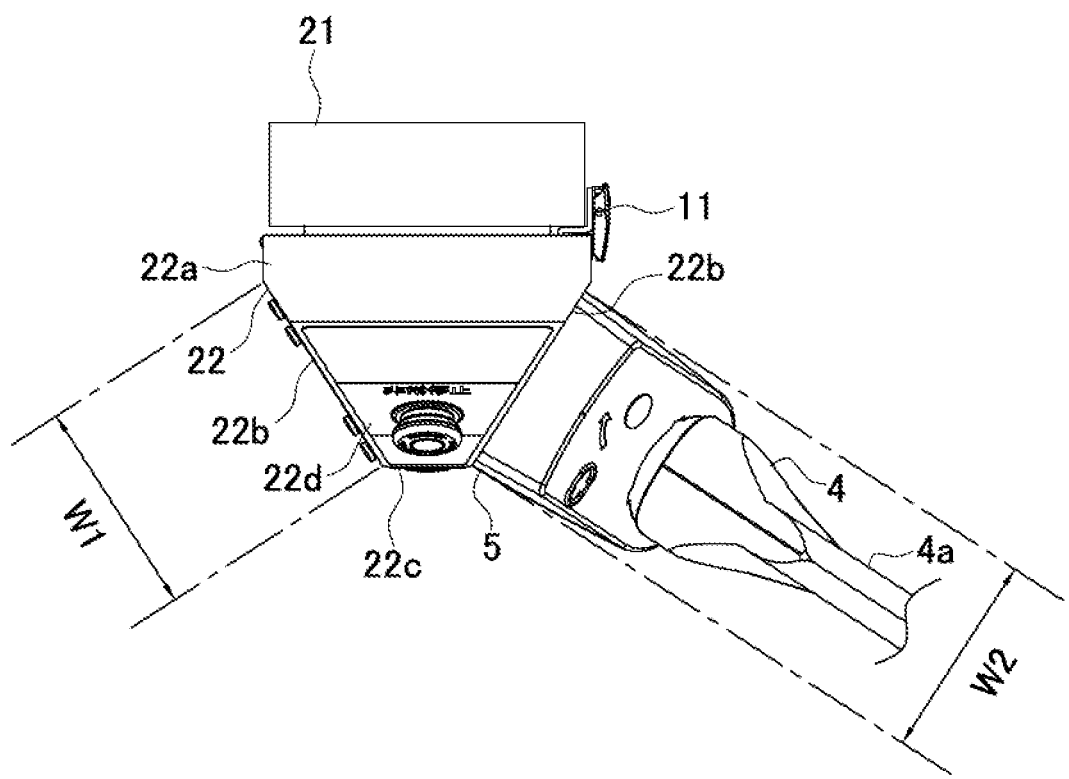
FIG. 3 is a plan view of FIG. 1.

The following describes an embodiment where the disclosure is embodied in detail with reference to the drawings. FIG. 1 to FIG. 3 illustrate an exemplary charge and discharge device for an electric vehicle according to the disclosure. FIG. 1 is a perspective view, FIG. 2 is a front view, and FIG. 3 is a plan view.

A charge and discharge device 1 for an electric vehicle has a metal housing 2 mounted on a wall surface to house a terminal block, and a circuit board. The charge and discharge device 1 for the electric vehicle includes a cable 3, a charge connector 4, a holder 5, a cable suspending portion 6, and similar components. The cable 3 is extracted from the housing 2 and incorporates an electric wire. The charge connector 4 is disposed at a distal end of the cable 3 to be coupled to an electric vehicle. The holder 5 holds the charge connector 4. The cable 3 is wound around and held by the cable suspending portion 6.

The charge and discharge device 1 for the electric vehicle has a function that performs discharge (supplying electric power outside using the electric vehicle as a power source) in addition to charge. An emergency stop button 1a is for stopping the charge and the discharge.

The housing 2 has a back surface, a top surface, a lower surface, and right and left side surfaces, and is constituted of a rectangular-shaped box body 21 whose front surface is opened, and a covering body 22 that covers the front surface of the box body 21. The covering body 22 is attached with a hinge to the box body 21 at a side portion on the left side in a front view. A latch-lock 11 is mounted on a side portion on the right side of the covering body 22 to ensure opening and closing the covering body 22. Then, a back surface of the box body 21 is fixed in close contact with a wall surface of a residence and the like. Thus, the charge and discharge device 1 for the electric vehicle is mounted on the wall surface.

The covering body 22 has a back portion with a rectangular-shaped base framing portion 22a that matches a front surface opening of the box body 21, and the covering body 22 is formed to cover the front surface of the box body 21 without a gap. The base framing portion 22a has a front side where flat surfaces (tapered surfaces) 22b that face obliquely ahead are bilaterally symmetrically formed at right and left side portions. These tapered surface 22b are vertically formed, and as a result, the covering body 22 is narrowly formed toward the front to be an approximately triangular shape in a section view as illustrated in the plan view of FIG. 3. Therefore, a front surface 22c of the housing 2 is formed with a narrow width and formed in a strip shape.

Then, a width W1, at a part at which the holder 5 is installed, of the tapered surface 22b is formed slightly wider than a width W2 of the holder 5.

The width W1 on the tapered surface of the mounting portion of the holder 5 may be identical to the width W2 of the holder 5, or may be further widely formed.

Further, at an upper portion of the front surface 22c, an inclined surface 22d that faces obliquely upward is formed to be placed on the left and right tapered surfaces 22b, thus being formed in an approximately triangular shape. The inclined surface 22d is formed at a region of about one-third of a length (height) of the housing 2 and evenly formed up to a part close to the base framing portion 22a.

While an upper portion of the tapered surface 22b is narrowed due to the formation of the inclined surface 22d, a lower portion at which the holder 5 is installed of the tapered surface 22b is evenly formed with the width W1. The emergency stop button 1a is disposed on the inclined surface 22d.

The holder 5 is made of synthetic resin. At the holder 5, a holding depressed portion 5a that houses a distal end of the charge connector 4 is formed toward an oblique upside. Then, the holder 5 is mounted on the lower portion of one tapered surface 22b on the right side in the front view.

The holding depressed portion 5a internally includes a lock portion (not illustrated) that locks the inserted charge connector 4 so as not to easily come out. When a charge operation or similar operation is performed, the charge connector 4 can be removed by grasping a grip portion 4a of the charge connector 4, and then, the distal end of the charge connector 4 is coupled to a charging port (not illustrated) of the electric vehicle.

The cable suspending portion 6 is disposed on the lower surface, from which the cable 3 is extracted, of the housing 2, and formed such that a rod-shaped steel material is folded into a hook shape. The cable 3 extracted from the lower surface of the housing 2 is wound around the cable suspending portion 6. Then, the charge connector 4 disposed at the distal end of the cable 3 is held to the holder 5.

Figure 4:
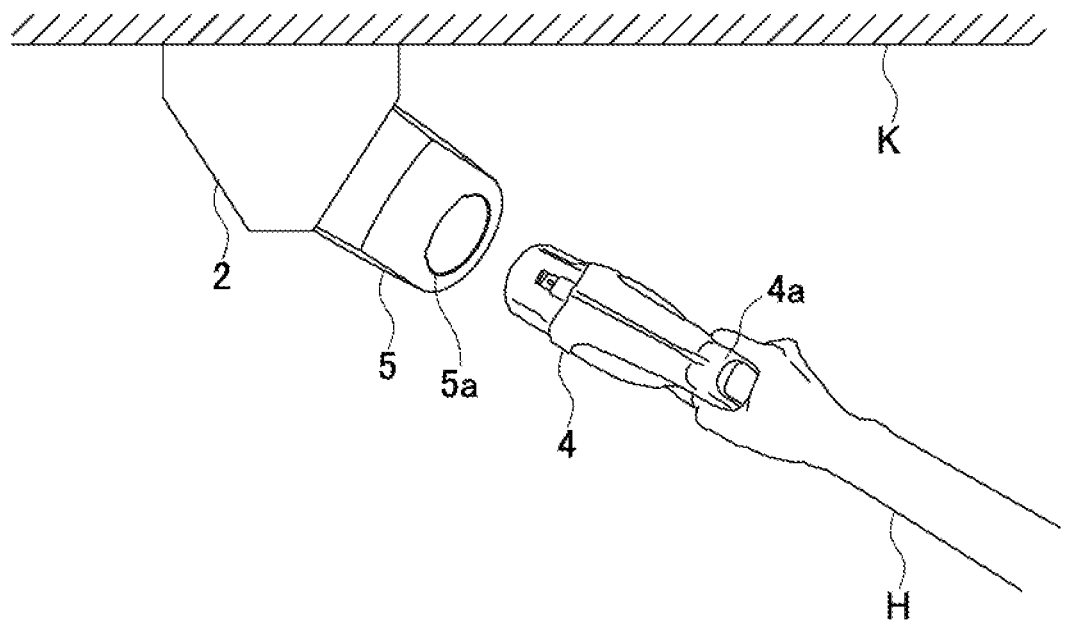
FIG. 4 is an explanatory view illustrating a grasped charge connector.

FIG. 4 illustrates a state where the charge and discharge device 1 for the electric vehicle configured as described above is mounted on a wall surface K, and then the charge connector 4 is being operated. A hand H indicates an arm (a hand) of a worker who performs the charge operation (or a discharge operation) in a state where the worker has grasped the grip portion 4a of the charge connector 4.

As illustrated in FIG. 4, even though the holder 5 is disposed at a part close to the wall surface K, since the side portion, on which the holder 5 is mounted, of the housing 2 is a slope formed obliquely ahead, the holder 5 is fixed facing obliquely ahead. Therefore, the grip portion 4a of the held charge connector 4 can be separated from the wall surface K.

Accordingly, when a holding/extraction operation of the charge connector 4 is performed, it is possible to prevent the charge connector 4 and the hand H that grips it from interfering with the wall surface K. In addition, compared with a configuration that holds the charge connector 4 toward a front perpendicular to the wall surface K, an amount of forward projection can be reduced. Thus, the worker becomes less likely to contact the charge connector 4. Then, a small space at a parking area of the residence can be effectively utilized.

Since the tapered surfaces 22b are formed from end portions of the front surface 22c at the right and left of the housing 2, right and left end portions of the front surface 22c are formed into obtuse angles. Accordingly, even though a person contacts the housing 2 when getting on and off an automobile and similar action, impact can be softened. Further, the upper portion of the projecting front surface 22c of the housing 2 has the amount of projection decreased by the inclined surface 22d facing obliquely upward. Thus, even though the person who gets on and off the automobile contacts the housing 2, the impact can be softened.

Since the holder 5 is installed at the lower portion having a sufficient width in the tapered surface 22b, the holder 5 can be mounted in a stable state without receiving influence of the inclined surface 22d.

In the above-described embodiment, the tapered surfaces 22b, which are inclined surfaces, are disposed at right and left both side portions of the housing 2 to form the housing 2 symmetrically. However, the tapered surface 22b may be disposed only at one side portion at which the holder 5 is disposed, and a side surface continuous with the box body 21 may be formed at the other side portion without disposing the inclined surface. The holder 5 is disposed on the right side in the front view. However, the holder 5 may be disposed on the tapered surface 22b on the left side.

Further, the tapered surfaces 22b are formed from middles of the side portions of the housing 2 to the front surface 22c such that the tapered surfaces 22b are formed on the covering body 22 and not formed on the side portions of the box body 21 of the housing 2. However, the box body 21 may be thinly formed to make whole side portions from vicinities of the back surface, which closely contact the wall surface K, to the front surface of the housing 2 as the tapered surfaces 22b. The inclined surface 22d may be eliminated and the front surface 22c may extend to an upper end of the housing 2.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A charge and discharge device for an electric vehicle, comprising:
   a cable that has a distal end at which a charge connector is provided, the charge connector being coupleable to an electric vehicle to charge and discharge;
   a holder that holds the charge connector; and
   a cable suspender that suspends and holds the cable, wherein
   the holder and the cable suspender are disposed at a housing installed on a wall surface, the cable being extractable from the housing,
   the housing has a rear side configured to be mounted to a wall surface, a side portion having a tapered surface facing obliquely to said wall surface as viewed in a plan view such that the housing has a greater width at the rear side mounted to the wall surface than at a front surface opposite to said rear surface, and the holder being mounted on the tapered surface,
   an upper portion of the front surface that is at a height above the holder extends closer to said rear wall than a lower portion of the front surface that is at a height aligned with the holder,
   the holder has an oblique surface that slants towards the tapered surface such as to be closer to the tapered surface at an upper portion of the oblique surface than at a lower portion of the oblique surface, the oblique surface having a receiving slot configured to hold the charge connector such that the charge connector extends away from the wall surface when held by the holder, and
   said tapered surface is one of plural tapered surfaces vertically formed at right and left side portions of the housing and formed from right and left end portions of said front surface of the housing,
   wherein the tapered surface is a slanted side surface of the housing which is slanted such that the width of the housing gradually decreases toward the front surface in the plan view,
   wherein the tapered surface is connected to the front surface at an front end of the tapered surface,
   wherein the holder is mounted on a lower portion of the tapered surface, and while a part on which at least the holder of the tapered surface is mounted has a width equal to or larger than a width of the holder, an inclined surface facing obliquely upward is disposed at a front surface upper portion of the housing, and the housing has a forward projection that decreases toward an upper portion,
   wherein the lower portion of the tapered surface has the same angled projection at a point where the tapered surface touches the front surface, and
   wherein the upper portion of the front surface is slanted such that the width of the front surface gradually increases toward upper direction.

2. The charge and discharge device for the electric vehicle according to claim 1, wherein
   the tapered surfaces are formed from the right and left end portions of the front surface at right and left of the housing with the right and left end portions of the front surface formed into obtuse angles.

* * * * *